R. G. HARRIS.
VEHICLE LAMP.
APPLICATION FILED APR. 28, 1911.
1,023,519.
Patented Apr. 16, 1912.
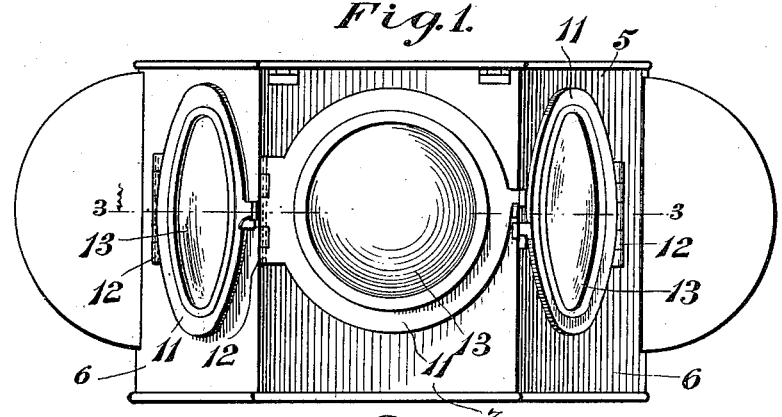
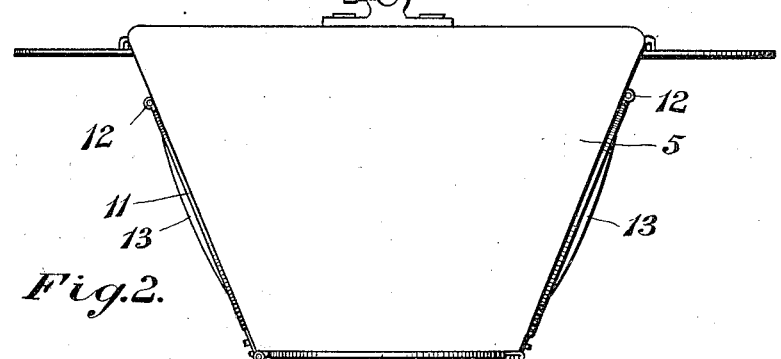
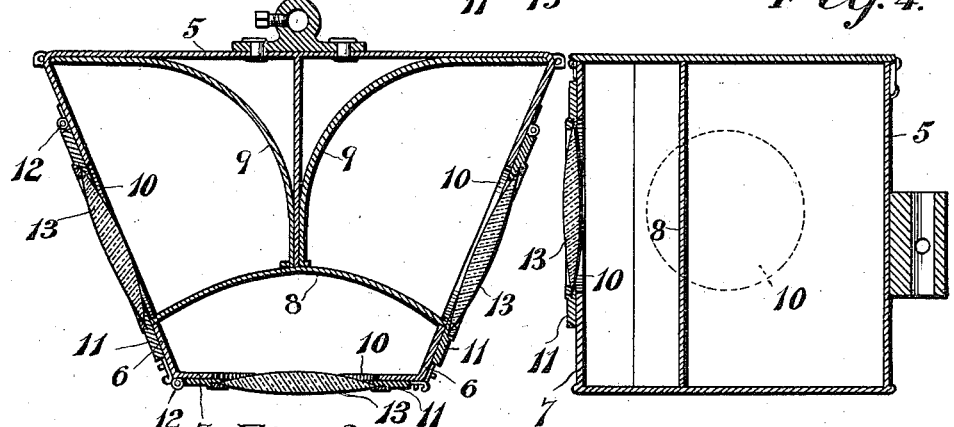
Inventor
Richard G. Harris,
By Victor J. Evans
Attorney
Witnesses
Thos. F. Knox

UNITED STATES PATENT OFFICE.

RICHARD G. HARRIS, OF KNOXVILLE, TENNESSEE, ASSIGNOR OF ONE-HALF TO FRANK M. HAMBRIGHT, OF KNOXVILLE, TENNESSEE.

VEHICLE-LAMP.

1,023,519.      Specification of Letters Patent.      Patented Apr. 16, 1912.

Application filed April 28, 1911. Serial No. 623,912.

*To all whom it may concern:*

Be it known that I, RICHARD G. HARRIS, a citizen of the United States, residing at Knoxville, in the county of Knox and State of Tennessee, have invented new and useful Improvements in Vehicle-Lamps, of which the following is a specification.

The invention relates to head lights, and more particularly to the class of lamps for use on vehicles, such as wagons, automobiles, locomotives, or other movable objects.

The primary object of the invention is the provision of a head light of his character in which a light may be thrown forwardly of and laterally at opposite sides of a movable vehicle, thereby enabling obstructions to be visible in advance of such movable object or at the sides thereof, irrespective of traveling in a direct course or around a curve, thereby avoiding a head-on collision.

Another object of the invention is the provision of a head light in which the body thereof is provided with front and side bull's eyes, whereby the light from the burner or burners interiorly of the body may be thrown forwardly of and angularly to opposite sides thereof, when mounted upon a vehicle, thus enabling the operator of said vehicle to observe obstructions of objects forwardly of the same, and also permitting pedestrians and vehicles to instantly recognize the approach of the vehicle when traveling in a direct course, or rounding curves in highways or in a track bed, thereby obviating accidents and collisions.

A further object of the invention is the provision of a head light which is simple in construction, efficient and reliable in purpose, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a front elevation of a head light constructed in accordance with the invention. Fig. 2 is a top plan view thereof. Fig. 3 is a sectional view on the line 3—3 of Fig. 1. Fig. 4 is a vertical longitudinal sectional view through the head light.

Similar reference characters indicate corresponding parts throughout the several views of the drawings.

Referring to the drawings by numerals, the head light comprises a body 5, preferably constructed from metal and formed with forwardly converging side walls 6, and a slightly outwardly bowed front wall 7, the interior of the body being provided with removable front and side reflector partitions 8 and 9, the same being inwardly bowed, and are adapted to reflect rays of light forwardly through bull's-eyes mounted in the sides and front of the body 5 of the head light.

Formed centrally in the side and front walls 6 and 7 are suitable light openings 10, the same being closed by circular shaped bull's eye frames 11 connected with the body by means of hinges 12, and these frames serve as doors to the body, whereby access may be had to the interior thereof for the lighting of the head light. Suitably secured within the frames 11 are glass bull's eyes 13, so that light rays may be cast exteriorly of the body of the head light on the lighting of the same.

The head light may be fitted with any approved burners; for instance, electric light bulbs, acetylene or oil burners, which are adapted to be placed within the body 5 forwardly of the reflector partitions 8 and 9, and directly in rear of the bull's eyes 13, so that upon the lighting of the bulbs or burners, the light will be cast through the bull's eyes and reflected by the reflectors forwardly from the head light body and at opposite sides thereof for illuminating purposes, the body of the head light being mounted in any conventional manner upon the front of the vehicle, such as a locomotive, automobile, or wagon, thereby enabling the light thrown forwardly and at opposite sides from the head light to make visible any objects in the path of travel of said vehicle, whether moving in a straight course or rounding a curve.

From the foregoing, taken in connection with the accompanying drawings, it is thought that the construction and operation of the invention will be readily understood, without requiring a more extended explanation, and therefore the same has been omitted.

What is claimed is:

In a head light, a body having a front, and forwardly converging sides, bull's eyes mounted in said front and sides of the body and reflector partitions mounted within the body rearwardly of the front and sides thereof, said partitions being inwardly bowed and the inner ends of two of the partitions being fixed to the medial portions of the back of the other partition whereby the light will be cast through said bull's eyes forwardly and at opposite sides of the body, substantially as described.

In testimony whereof I affix my signature in presence of two witnesses.

RICHARD G. HARRIS.

Witnesses:
J. M. McTEER,
MACK STAMS.

Copies of this patent may be obtained for five cents each, by addressing the "Commissioner of Patents, Washington, D. C."